UNITED STATES PATENT OFFICE.

MARTIN LANGE, OF AMERSFOORT, NETHERLANDS.

PROCESS OF MAKING THIO-OXYDIPHENYLAMINE.

SPECIFICATION forming part of Letters Patent No. 431,472, dated July 1, 1890.

Application filed October 9, 1889. Serial No. 326,469. (Specimens.)

*To all whom it may concern:*

Be it known that I, MARTIN LANGE, doctor of philosophy, a subject of the King of Prussia, residing at Amersfoort, Kingdom of Holland, have invented a new and useful Process for the Production of Thio-Oxydiphenylamine, whereof the following is a specification.

My invention relates to the production of thio-oxydiphenylamine. The method which I employ for obtaining this substance consists in dissolving a salt of metaoxydiphenylamine in water, in adding sulphur thereto, and in heating the mixture. The sulphur will then dissolve in the solution of the said salt and thio-oxydiphenylamine will be formed containing two atoms of sulphur in its molecular formula and forming salts with alkalies. This reaction may with advantage be promoted by adding an alkali or alkaline carbonate in excess, the alkali in this case operating to dissolve the sulphur and to form therewith an alkaline sulphide, which then gives off the sulphur to the metaoxydiphenylamine; or, the sulphur is first dissolved with application of heat in a solution of an alkali or alkaline carbonate, so that, according to the variable proportions of the substances employed, a sulphide or a polysulphide is obtained. The metaoxydiphenylamine salt is introduced into the solution of the sulphide or polysulphide, and the mixture is heated again. Instead, however, of preparing the said alkaline sulphide or polysulphide as described, the same may also be employed in the state in which they form articles of commerce. From its solution the thio-oxydiphenylamine can be precipitated by the addition of an acid or an acid salt. In purified condition it consists in a light-yellow tasteless powder, which dissolves easily in alkalies and likewise, though more difficultly, in alkaline carbonates. Alcohol and acetic acids are also solvents of the same. In pure water and in benzine it is insoluble. The solutions are of yellow color. When heated, the substance becomes brown, and it melts at about 155° centigrade.

The following are directions according to which the process may advantageously be carried out in practice:

First. Two hundred and forty parts, by weight, of sodium hydroxide are dissolved in water, and one hundred and eighty-five parts of metaoxydiphenylamine salt are added. The solution thus obtained is heated, and two hundred parts of sulphur are gradually introduced into the same, the heating being continued until the sulphur is completely dissolved. By the addition of sodium bicarbonate to the hot liquor the thio product is precipitated in the form of a light-yellow powder. By dissolving the said powder in cold alkaline lye and reprecipitating by means of acetic acid the product is rendered pure.

Second. Two hundred and fifty parts, by weight, of sodium hydroxide are dissolved in water, and the solution is heated with two hundred parts of sulphur until no more sulphur dissolves. The liquor, after having been decanted from any sulphur which may have remained undissolved, is then mixed with one hundred and forty-five parts of metaoxydiphenylamine salt, and the mixture is heated in a closed digester up to 150° or 200° centigrade. The further treatment of the product is the same as stated in the first prescription.

The described thio-oxydiphenylamine is to be used as a medicament in the treatment of wounds. The mode of its application is the same as that of iodoform. It especially diminishes the secretion of suppurating wounds, and it possesses the advantage of having no smell and of being absolutely innocuous.

I claim as my invention—

1. The process of producing thio-oxydiphenylamine, which consists in heating together a salt of metaoxydiphenylamine, water, and sulphur, substantially as and for the purpose described.

2. The process of producing thio-oxydiphenylamine, which consists in heating a salt of metaoxydiphenylamine with water, sulphur, and an alkali or alkaline carbonate, or with a sulphide or polysulphide of alkali as the equivalent of sulphur and alkali or alkaline carbonate, substantially as specified.

3. An article of manufacture, consisting in a compound of metaoxydiphenylamine with two atoms of sulphur and called "thio-oxydiphenylamine," the said compound being a light-yellow powder easily soluble in alkalies, soluble in alcohol and acetic acid, and also, though more difficultly, soluble in alkaline carbonates, whereas it is insoluble in pure water and benzine, the solutions are of yellow
5 color, and when heated the substance becomes brown, and it melts at about 155° centigrade, substantially as described.

In testimony whereof I have hereunto set my hand in the presence of two subscribing witnesses.

MARTIN LANGE.

Witnesses:
PAUL PICK,
O. W. F. HAUNN.